United States Patent
Kemper et al.

[11] Patent Number: 5,992,050
[45] Date of Patent: Nov. 30, 1999

[54] DESOLVENTIZER

[75] Inventors: Timothy G. Kemper, Piqua, Ohio; Richard D. Farmer, St. Louis, Mo.

[73] Assignee: The French Oil Mill Machinery Company, Piqua, Ohio

[21] Appl. No.: 09/189,576

[22] Filed: Nov. 11, 1998

Related U.S. Application Data

[60] Provisional application No. 60/076,030, Feb. 26, 1998.

[51] Int. Cl.⁶ .................................................. F26B 17/00
[52] U.S. Cl. ............................. 34/588; 34/237; 34/239; 34/240
[58] Field of Search ............................. 34/577, 586, 588, 34/593, 103, 104, 106, 174, 194, 195, 237, 239, 240; 422/268, 269, 272, 273, 275; 211/115, 129, 144, 164; 209/234, 244, 269

[56] References Cited

U.S. PATENT DOCUMENTS

| | | | |
|---|---|---|---|
| 2,695,459 | 11/1954 | Hutchins | 34/17 |
| 2,806,297 | 9/1957 | Hutchins | 34/173 |
| 3,126,285 | 3/1964 | Lippold | 99/98 |
| 4,125,379 | 11/1978 | Saxon | 422/269 |
| 4,376,052 | 3/1983 | Gessler | 210/511 |
| 4,390,506 | 6/1983 | Schumacher | 422/273 |
| 4,444,656 | 4/1984 | Nelson et al. | 209/347 |
| 4,453,832 | 6/1984 | Schumacher et al. | 366/167 |
| 4,519,902 | 5/1985 | Kinder | 209/234 |
| 4,603,492 | 8/1986 | Koch et al. | 34/237 |
| 4,619,053 | 10/1986 | Schumacher | 34/12 |
| 4,862,602 | 9/1989 | Krill | 34/239 |
| 5,591,416 | 1/1997 | Kemper et al. | 422/268 |
| 5,705,133 | 1/1998 | Kemper et al. | 422/268 |

OTHER PUBLICATIONS

The French Oil Mill Machinery Company, "Desolventizer Toasters (DT): Unmatched Performance and Reliability" 1995 company publication.

Primary Examiner—Henry Bennett
Assistant Examiner—Steve Gravini
Attorney, Agent, or Firm—Biebel & French

[57] ABSTRACT

Improved desolventizer of the countercurrent type. Solvent laden solids enter a closed chamber wherein they are continuously agitated by stirrers. Steam from below rises up through a porous deck and the solids thereon whereupon the steam condenses to release its heat of vaporization thereby aiding in the evaporation of solvent in the solids. The desolventized solids exit the chamber through a discharge passage. The deck includes generally radially spaced apart, substantially parallel stainless steel bars supported on substantially radially extending carbon steel supports. The spaces or slots thereby defined by the bars define an open area covering up to about 30% of the surface area of the deck. The gaps between the bars are sufficiently narrow so as to reduce the likelihood of the solids being worked into the gaps. The bars have a cross sectional profile having a greater width at their top and a lesser width at their bottom so as to promote clearing of any material that might have been worked therebetween from the top side.

15 Claims, 4 Drawing Sheets

DESOLVENTIZER

PRIOR PROVISIONAL APPLICATION

Applicant claims the benefit of the filing date of Provisional Application Serial No. 60/076,030, filed Feb. 26, 1998.

BACKGROUND OF THE INVENTION

This invention relates to desolventizers for recovering residual solvent from solids, such as the flakes or meals of seeds which have had their oil and fat previously extracted by solvent extraction. The invention can also be applied to any solid on which the operation of solvent extraction has been performed. More particularly, this invention relates to an improved deck for use in a desolventizer, or the like.

Solvent-laden meals are obtained in the process of extracting oils and fats from seed materials, such as soybean, grape, sunflower seed, nut material, and the like. Solvents or extractants typically used for this purpose are, for example, benzene, propane, butane, pentane, hexane, or mixed solvents, such as mixtures of the above-mentioned hydrocarbons with alcohols, ketones, or generally polar solvents. The miscella formed in the extraction of the above-mentioned raw materials is separated from the residue (meal) and forwarded for further processing such as purification or distillation, or the like.

The residue of the extraction process, that is, the mixture of meal, solvent, and water, is treated in a desolventizing apparatus for the purposes of recovering the solvent and obtaining a low-solvent or solvent-free meal. Such meals may contain as much as 35% by weight of solvent prior to the desolventizing process.

Processes and apparatuses suitable for desolventizing solvent extracted solids have long been known. In these devices, solvent is typically evaporated from the meal by steam or steam-containing fluids with the solvent returned to a recovery apparatus such as a fractional distillation unit or the like in a mostly continuous operation. For example, U.S. Pat. No. 2,806,297 to Hutchins, and U.S. Pat. No. 4,619,053 to Schumacher, disclose apparatuses of the countercurrent steam injection type for separating solvent from solvent laden solids in a continuous process.

Typically, such apparatuses consist of a plurality of chambers or compartments arranged in a vertical configuration. Solvent laden solids may be introduced into the uppermost chamber where they pass downwardly from an upstream to a downstream direction from chamber to chamber. The treated meal may be removed from the lowermost chamber. Live steam, or steam-containing vapors may be introduced below the deck of the lowermost chamber. The steam rises in countercurrent fashion through the solvent laden solids, with the solvent vaporizing. A mixture of steam and evaporated solvent is then channeled from the uppermost chamber to conventional recovery equipment.

The decks between chambers may include discharge passages or chutes for the downward movement of meal. The decks may also include bores or perforations to permit the upward movement of steam and evaporated solvent. The apparatus may include a centrally disposed vertical shaft running through the chambers with stirrers mounted on the shaft for rotation within each chamber. The stirrers may pass just above the top surface of the decks so as to keep the meal in a constant state of agitation.

One or more of the upper chambers may be used for pre-desolventizing. For this purpose, one or more of the upper decks may be constructed of double-walled imperforate steel, and have a central aperture surrounding the vertical shaft to permit the upward passage of steam and evaporated solvent. Steam may be admitted into the space between the double walls so as to provide indirect heating of the solvent laden solids.

One or more of the lower chambers may be used for stripping or toasting the meal after most of the solvent has been evaporated from the meal. For this purpose the decks may consist of a double wall construction having bores or perforations therethrough. The double wall construction permits steam to be admitted into the deck thereby heating the deck and inhibiting the condensation of steam thereon. The bores or perforations permit steam that is admitted below the deck to travel upwardly through the meal without substantially condensing in the meal.

In the chamber where most of the desolventizing may take place, the steam or steam-containing vapors admitted from below the deck rise through the solvent laden solids and may condense therein, thereby evaporating the solvent contained in the meal via the latent heat of evaporation of the condensing steam.

In some cases, the combination of liquid water and the high protein content in the meal can cause agglomeration of the meal, producing what are known in the art as "water balls". These water balls may be golf-ball-sized clumps of meal and water that are substantially impervious to the steam. As a consequence, solvent trapped in the water balls may not be removed by evaporation. This can lead to localized areas within the processed meal that have higher than desired concentrations of solvent.

In some of the prior art designs, undesirably high pressure drops are experienced as measured from downstream to adjacent upstream treatment zone. Often, this problem results from clogging of the perforations or bores that are provided in the decks that, ideally, allow steam communication from a downstream treatment zone to its adjacent, upstream treatment zone.

Additionally, when such clogging occurs, the steam primarily travels upwardly through the meal discharge chutes that are disposed in the deck surface to provide for passage of the meal through the deck from an upstream to downstream zone. When this happens, the meal can be impeded from making proper passage, thus increasing the chance that it will not be evenly distributed around the deck.

Typical designs provide deck bores or perforations in an amount of about 1–3% open deck space. These designs may be of some value in increasing steam velocity through the holes in the deck to inhibit the plugging or clogging problems, but the concentration of steam pressure at these few, discrete openings increases the likelihood of steam plume formations that drive deeply into or even divide the solvent laden meal into a plurality of segregated, clumpy masses resulting in non uniform solvent evaporation and possibly in the "water-ball" phenomenon referred to above.

Accordingly, there is a need in the art for the provision of a deck structure that will promote more uniform steam pressure distribution from treatment zone to treatment zone and help solve the prior art problems referred to above.

SUMMARY OF THE INVENTION

The present invention provides an improved desolventizer for solvent extracted solids having at least one closed chamber wherein the closed chamber has an improved deck disposed adjacent the bottom of the chamber. The deck is composed of a plurality of parallel, spaced bars for supporting solids thereon. Mounting supports for supporting the bars are provided with the supports also positioned within the chamber. The deck is also provided with a discharge passage to discharge the solids from the chamber.

The bars are preferably arranged so that they are generally radially spaced from each other around a vertically extending shaft such that a stirrer rotatably mounted to the vertical shaft will sweep the meal in the chamber in a direction generally parallel to and over the bars. The bars are radially spaced apart a sufficiently small distance to prevent meal from dropping therethrough. The mounting supports may extend substantially radially away from the shaft.

The improved deck is composed of a plurality of pie shaped screen sections, bolted together to preferably form a circularly shaped deck surface. The bars in the screen sections, when assembled together, form a generally annular array matching the rotational direction of the meal as it is swept along the surface. The bars which make up the screen are especially designed to prevent plugging. To that end, the bars have a greater width at the deck surface than below. The gaps between the bars, at the deck surface area, represent from about 5–30%, preferably 20–30%, of the total surface area of the deck.

The surface of the bars has a very low coefficient of friction so as not to interfere with the circular, sweeping motion of the meal thereon. Preferably, the bars are composed of 304 stainless steel.

DETAILED DESCRIPTION OF THE PREFERRED EMBODIMENT

Figure 1:
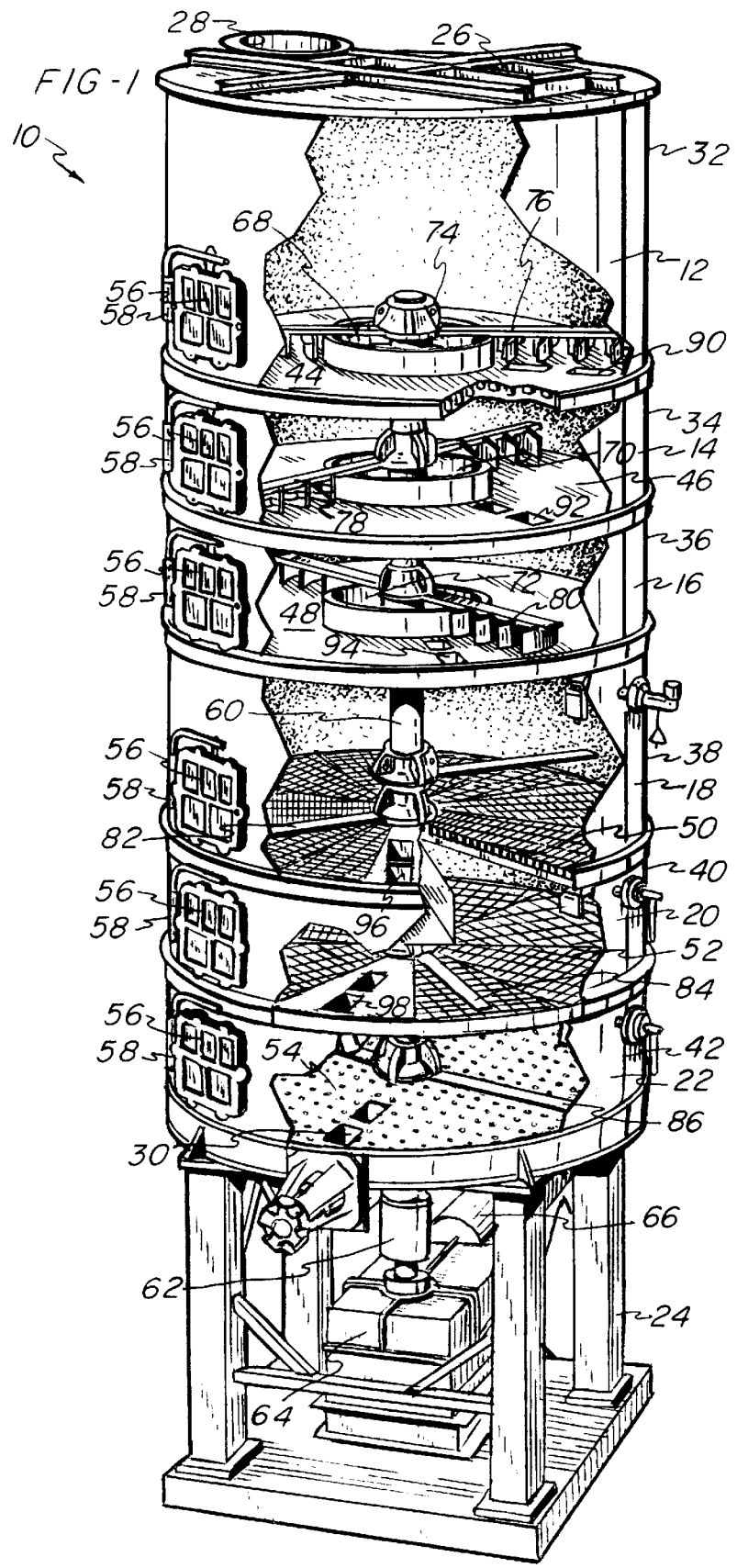
FIG. 1 is a partial cutaway perspective drawing of a desolventizer toaster constructed in accordance with the apparatus of the invention.

Referring first to FIG. 1, a desolventizer toaster 10 incorporating an embodiment of the instant invention is shown. The desolventizer toaster 10 includes a structure formed of a plurality of connected sections or chambers 12, 14, 16, 18, 20 and 22 arranged in superposed vertical relation, with the lowermost or most downstream chamber 22 supported on a suitable base frame 24. Solids to be extracted, such as comminuted soybeans, are introduced through a hopper or feed device (not shown) into an inlet 26 that discharges into the upper part of the uppermost or most upstream chamber 12. A top vent 28 leads from the upper part of the top section 12 to a condenser (not shown). The solvent laden solids, after being desolventized and toasted in their passage from the upstream to downstream direction through the chambers 12 through 22, are discharged through a discharge passage 30 in the lowermost chamber 22.

The chambers 12–22 may be formed of cylindrical housings 32, 34, 36, 38, 40 and 42, respectively. The housings 32 through 42 may be steam-jacketed. Hollow floors or decks 44, 46, and 48 may be disposed between abutting ends of the chambers 12, 14, 16 and 18. Steam may be admitted into decks 44, 46 and 48 to thereby indirectly heat the decks and the solvent laden solids above each deck.

Improved decks 50 and 52 in accordance with the invention are provided between treatment chambers 18, 20 and 22 and include substantially parallel, radially spaced bars and substantially radially extending supports in accordance with the present invention to permit the uniform distribution of steam throughout the solvent laden solids disposed there above. Deck 54 forms the bottom of the lowermost chamber 22 to permit the introduction of live sparging steam into the chamber 22.

Each section 12–22 is provided with a door opening which is normally sealed by a door 56 mounted on a hinge 58 to permit access to the interior of the respective chambers.

A vertical shaft 60 extends upwardly through all of the decks 44, 46, 48, 50, 52 and 54. At its lower end, the shaft 60 is connected by a coupling 62 to a reduction gear device 64 which is driven by a motor 66. The decks 50, 52 and 54 are provided with bearings and seals (not shown) where the shaft 60 passes through them, so as to seal or close each opening through which the shaft 60 passes. Decks 44, 46 and 48 are provided with central vents 68, 70 and 72 surrounding the shaft 60 to provide for the upward venting of vapors from the chambers below. The shaft 60 also carries, in each chamber, a hub 74 which is tightly coupled thereto. Each hub 74 carries one or more stirrer arms 76, 78, 80, 82, 84 and 86. The stirrers 76, 78, 80 in chambers 12, 14, 16 may be provided with short arcuate sections depending vertically downward therefrom so as to provide increased radial mixing of the meal within these chambers. Stirrers 82, 84, 86 sweep closely over their respective decks 50, 52, 54 and may be provided with a leading beveled edge so as to scrape the decks clean of solids and permit the solids to pass or tumble over the upper face of the stirrer arms 82, 84, 86.

The decks 44, 46, 48, 50, 52 and 54 are provided with discharge passages or chutes 90, 92, 94, 96, 98 and 30, respectively, to provide for the downward movement of solvent extracted solids from one chamber to the next. The inlet for each discharge passage or chute may be offset from the exit of the immediately preceding discharge passage or chute in a radial direction opposite to the direction of rotation of the stirrer arms so as to prevent meal from discharging directly from the exit of one chute into the inlet of the next chute.

Turning now to FIGS. 2–5, an improved desolventizer deck 50 made in accordance with the invention may be seen. The desolventizer deck 50 includes a plurality of pie piece shaped screen sections 102 and a discharge section 104 arranged in abutting relationship to form a cylindrical deck. The deck 50 in FIG. 2 includes 11 screen sections 102 and a discharge section 104. In this embodiment, each screen section 102 has a substantially pie or wedge shape spanning an arc of about 30°. Although the deck 50 as shown includes a plurality of generally arcuate screen sections 102, the deck 50 may be made as an integral structure.

Figure 3:
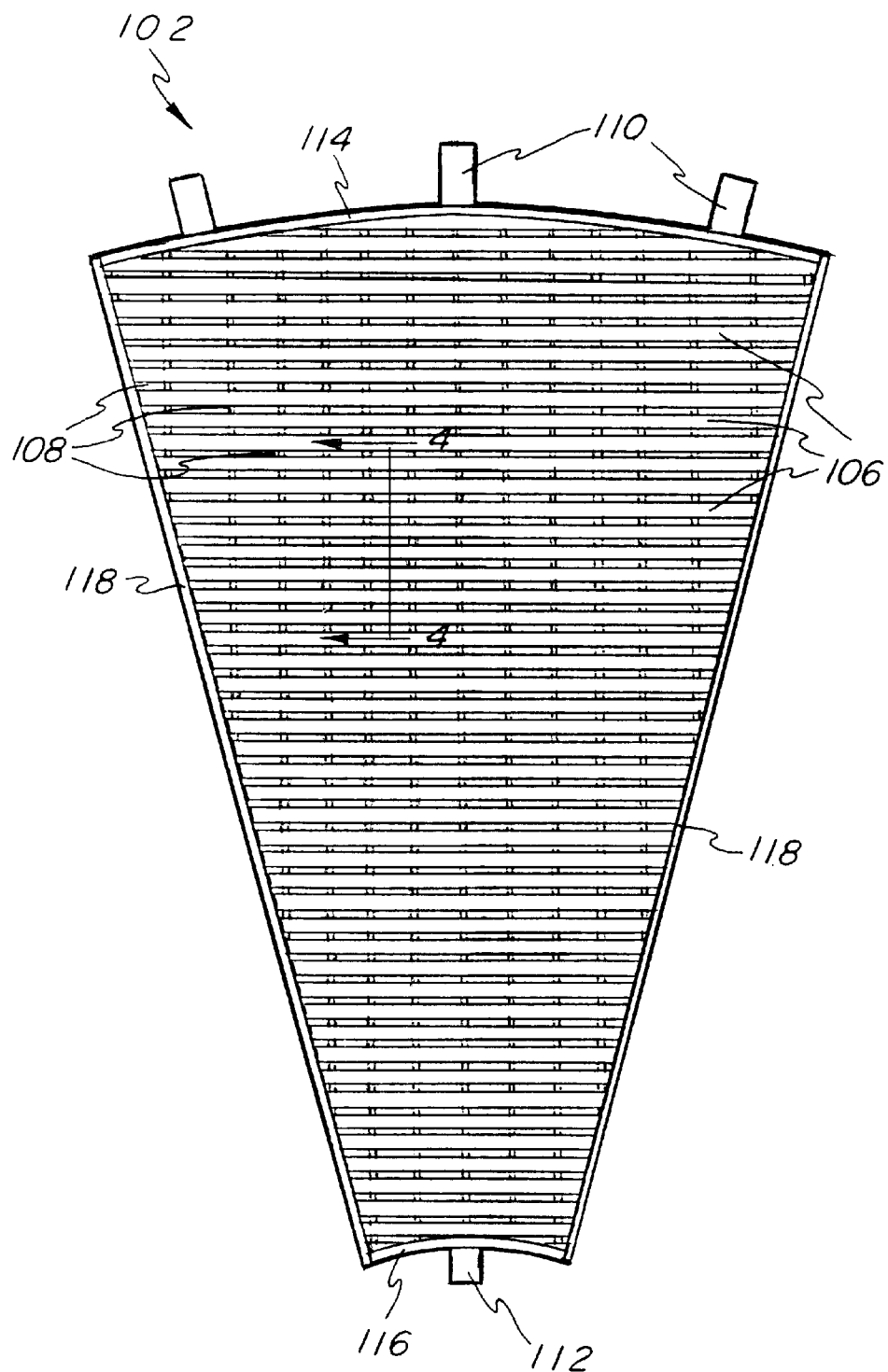
FIG. 3 is a top plan view of one of the screen sections of the deck of FIG. 2.

With specific reference to FIG. 3, the screen sections 102 may include a plurality of bars 106 defining the top surface of the deck 50, and a plurality of supports 108 supporting the bars 106 thereon. Each of the screen sections 102 may include outer mounting flanges 110 and inner mounting flange 112. The outer mounting flanges 110 permit an outer peripheral edge of each screen section 102 to be fastened or attached to the housing 38 of the desolventizer chamber 18. The inner mounting flanges 112 permit the screen section 102 to be attached or fastened to an annular sleeve or seal (not shown) in sealing engagement about the vertical shaft 60. As may be seen in FIG. 3, each screen section may also include an outer peripheral frame bar 114, an inner peripheral frame bar 116, and side frame bars 118.

The discharge section 104 (FIG. 2) may include a solid planar surface 120 having the discharge passage 96 therein. The discharge passage 96 may be valved or gated by means well known in the art. The discharge section 104 may also include outer mounting flanges 110 and inner mounting flanges 112.

Figure 2:
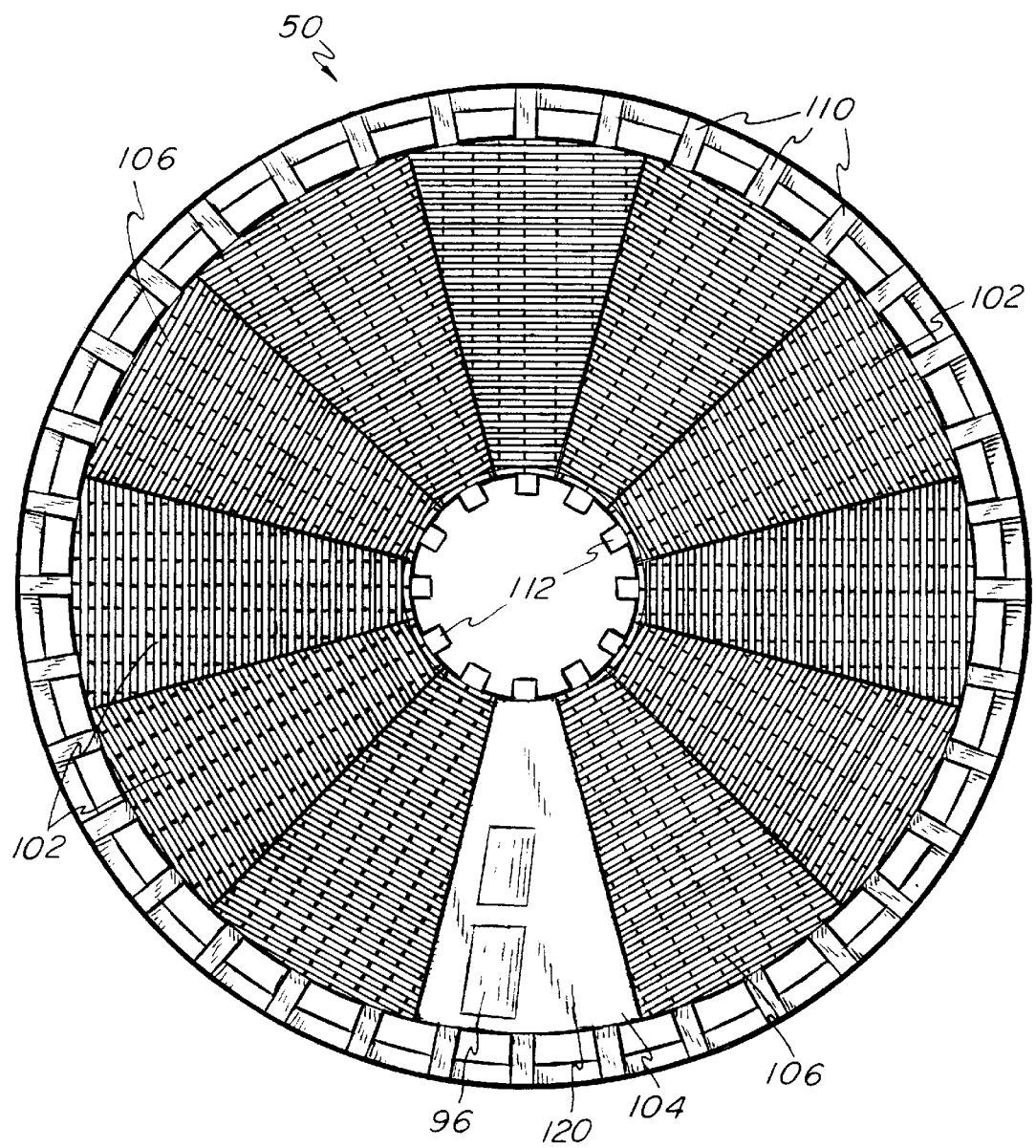
FIG. 2 is a top plan view of an improved desolventizer deck made in accordance with the invention.

As best seen in FIG. 2, bars of each screen section 102 preferably are oriented in substantially parallel relationship. When the screen sections are assembled as shown in the drawing to provide a generally circular deck surface, the bars 106 are oriented so as to be substantially parallel with the direction of rotation of the stirrer arm 82. Together, the bars 106 comprise generally arcuate sections spaced radially apart from each other so as to lie parallel to the direction of rotation of the stirrer 82. This arrangement of the bars minimizes shear forces acting on the solvent extracted solids as they are swept around the chamber 50.

Figure 4:
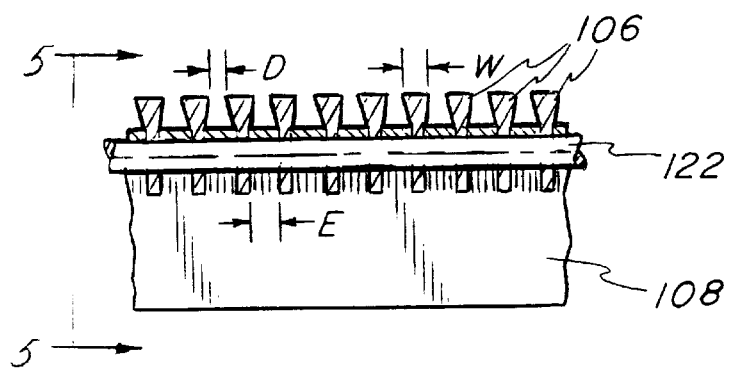
FIG. 4 is an enlarged sectional elevation view of the screen section of FIG. 3 taken along the plane shown by the lines and arrows 4—4 in FIG. 3.
Figure 5:
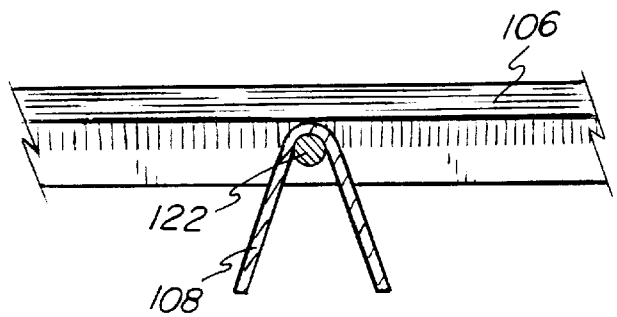
FIG. 5 is an enlarged sectional elevation view of the screen section of FIG. 3 taken along the plane shown by the lines and arrows 5—5 of FIG. 4.

Details of the desolventizer deck structure may be seen in FIGS. 4 and 5. Preferably, the bars 106 have a greater width W at their top than they do at their bottom. This results in the distance E between the bottom of the bars 106 being wider than the distance D that separates the tops of the bars 106 from each other. Any solvent extracted solids that may become worked between the bars 106 may therefore drop freely through the bars 106 thereby keeping the spaces between the bars 106 free of clogging material.

As shown, the bars 106 and supports 108 are oriented perpendicularly to each other. The supports 108 are formed from bands of stainless steel bent about their longitudinal axis to form an inverted U or V shape. The bars may be fit into slots cut into the bend of the supports 108 at right angles to the bend axis. The spacing of the slots determines the spacing of the bars 106. The underside of the bars 106 may include holes or openings passing therethrough and aligned such that a rod 122 may pass therethrough. Thus, the rod 122 acts as a key to secure the bars 106 to the supports 108. The bars 106 may be further secured to the supports 108 by tack-welding the rods 122 to the supports 108. The bars 106, supports 108, and rods 122 may all be made of stainless steel. However, other suitable materials may be used, if desired. Preferably, the bars 106 are adapted to have substantially flat upper surfaces defining the upper surface of the deck 50 and have a relatively low coefficient of friction.

In a typical arrangement, the width W of each bar 106 may be about 0.125 inch (3.175 mm) and the separation distance D between the tops of adjacent bars 106 may be about 0.08 inch (2.032 mm). The resulting arrangement of bars 106 and supports 108 produces an arrangement of spaces or slots having a sufficiently narrow width to prevent appreciable amounts of solids from falling therethrough while simultaneously providing significant surface area for the passage of steam therethrough. The resulting openings or gaps through the bars 106 and supports 108 of the deck 50 as measured by the distance D between the bars on the upper or top surface of the deck may comprise as much as about 30% of the total surface area of the deck 50. Typically, a deck designed in accordance with the instant invention will provide openings to permit the passage of steam therethrough having a total surface area of about 20% to about 30%. However, improved decks in accord with the invention may generally be said to include a total open space of between about 5–30% of the deck surface.

The operation of the desolventizer toaster 10, shown in FIG. 1, incorporating the instant invention will now be described. For purposes of illustration only, this process will be described for soybean meal from which the oils have been stripped by hexane used as a solvent. Solvent laden solids are admitted into the uppermost chamber 12. The soybean meal entering the uppermost chamber 12 may comprise up to 35% by weight of hexane. In the particular embodiment shown in FIG. 1, the uppermost three sections or chambers 12, 14 and 16 comprise a pre-desolventizing stage. The stirrer arms 76, 78, 80 maintain the meal in a constant state of agitation. The meal in each of the pre-desolventizing chambers 12, 14, 16 is maintained at a depth of about six inches. Steam is injected into the decks 44, 46, 48 at a pressure of about 150 psi and a temperature of about 365° F. (185° C.). The decks 44, 46, 48 thus act as hot plates to evaporate hexane from the soybean meal. Hexane evaporated from the meal rises upwardly through the central vents 68, 70, 72 to exit the uppermost chamber 12 through the top vent 28. The outlet vapor exiting the top vent 28 typically has a hexane content of about 92% and a water content of about 8%. The temperature of the hexane vapor is generally maintained at a temperature of about 155° to 160° F. (68° to 71° C.). In this way, as much as about 25% of the hexane may be driven off from the meal in the pre-desolventizing stage.

Figure 6:
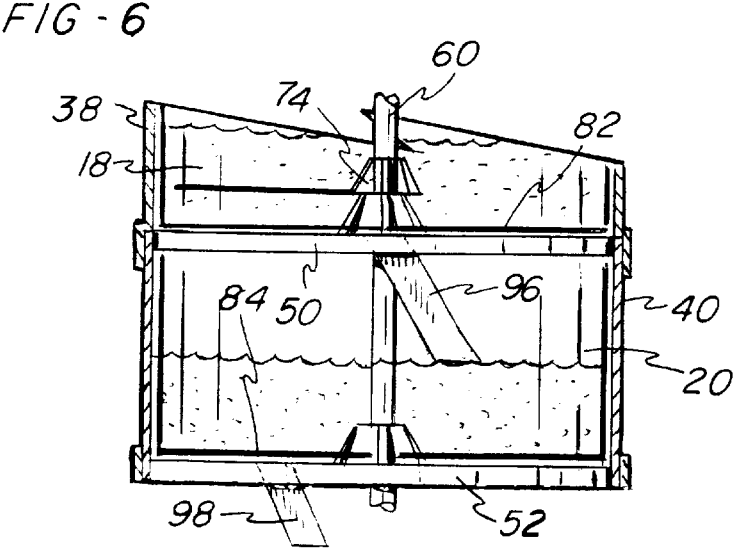
FIG. 6 is an elevation view of a desolventizing chamber and a toasting chamber incorporating the deck of FIG. 2.

The pre-desolventized meal exits chamber 16 through the discharge passage 94 into the desolventizing chamber 18, as may be seen in more detail in FIG. 6. The meal may be maintained at a depth of from about two feet to about four feet in the desolventizing chamber 18. Rotating stirrer arms 82 continuously agitate the meal. Steam rising up from the chamber below passes through the deck 50 into the meal where it condenses thereby giving up its latent heat of vaporization so as to aid in evaporation of more solvent. Nearly all of the remaining 75% of the hexane is evaporated in this step.

The steam enters the meal in the desolventizing chamber 18 with a temperature of about 225° F. (107° C.). Ideally, the condensed steam forms an azeotropic mixture with the hexane, with the mixture having a boiling point of about 143° F. (62° C.). The hexane-water vapor mixture exits the chamber through the central vent 72 with a temperature of about 155° F. (68° C.).

Because of the relatively large open area of the deck 50 the steam tends to be homogeneously distributed throughout the meal in the chamber 18. Consequently, the steam tends to condense only in a relatively narrow band at a fairly uniform depth within the meal. The resulting shallow band of condensation inhibits the formation and size of water balls.

In addition, the large open area of the deck 50 tends to present a lower pressure drop to the steam as it passes through the deck 50 than in many of the prior art devices. This lower pressure drop minimizes the possibility of steam plumes driving deeply into the meal and possibly even punching through the meal dividing it into an assembly of separate clumps or piles.

In some prior art desolventizers, the pressure drop between treatment zones is so great that the pressure that builds up below the deck 50 is such that it prevents meal from exiting the chamber 18 through the discharge passage 96. In such cases, it has been necessary to interrupt the process in order to reduce the pressure below the deck 50 sufficiently to allow the meal to resume its progress from the desolventizing chamber 18 to the next lower chamber. The low pressure drop developed by the improved deck 50 minimizes the possibility of the pressure building in the chamber below and blocking the passage of the desolventized meal.

After the meal has left the desolventizing chamber 18 it enters the first toasting/stripping chamber 20. Stirrers 84 continuously agitate the meal in the toasting/stripping chamber 20, where the nearly solvent-free meal is toasted to a golden yellow color. Because the meal is nearly solvent-free and has been preheated by the preceding stages, steam rising up through the deck 52 from the chamber below passes through the meal with almost no condensation.

The deck 52 may also be constructed in accordance with the present invention. Consequently, the first toasting/stripping stage may enjoy the same advantages as the desolventizing stage. The large open area of the deck 52 promotes homogeneous mixing and steam penetration of the meal, thereby promoting more uniform toasting. The spacing of the bars 106 tends to prevent clogging of the spaces therebetween while the cross-sectional profile of the bars 106 promotes clearing of the spaces therebetween.

After the first toasting/stripping stage, the meal proceeds downstream and exits chamber 20 by means of the discharge passage 98 whereupon it enters the second toasting/stripping chamber 22. As before, stirrer arms 86 continuously agitate the meal in the second toasting/stripping chamber 22. Live steam is injected into the chamber 22 through a plurality of small openings in the sparging deck 54. This live steam strips away any remaining residual traces of hexane or other solvents in the meal. The processed meal then exits the chamber through the discharge passage 30 where it is removed for further processing.

It is apparent that the use of improved decks 50, and 52 of the invention provides greater area for steam vapor passage than in prior art decks which exhibit 1–3% open deck surface area. This, of course, significantly reduces the pressure drop through the deck. Reduced pressure drop improves the stability of controlling the depth of the solvent-laden meal supported above the deck surface. It also reduces the amount of steam that short circuits through the meal downspouts.

Additionally, the deck construction in accordance with the invention requires less pressure below the deck to push the steam upward, which can reduce fugitive solvent loss, or alloy a greater number of countercurrent decks in series.

The greater open area for steam vapor passage provided by the decks constructed in accordance with the invention results in better distribution of countercurrent steam. This improves the efficiency of steam use and reduces cool spots in the meal which can lead to "water ball" formation and meal agglomeration.

Further, the low coefficient of friction deck surface results in reduced power consumption in the drive for the agitators that stir the meal supported on the deck.

While the instant invention has been described with reference to a desolventizer toaster, it may be used in a combination desolventizer toaster dryer cooler (DTDC) configuration, as is well known in the art.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A desolventizer apparatus including:
   a deck;
   a chamber located below said deck and adapted for reception of steam therein;
   a treatment zone located above said deck and adapted for reception of solvent-laden meal; and
   wherein said deck includes a plurality of spaced bars forming a deck surface of said treatment zone and adapted for said reception of said solvent-laden meal thereon, spaces between said bars forming an open area surface of said deck surface for communicating said steam from said chamber to said meal, said open area comprising more than about 5% of said deck surface.

2. In a desolventizer apparatus including a deck surface area, a steam supplied chamber below said deck surface area, and a treatment zone above said deck surface area wherein in said treatment zone steam communicated from said chamber is mixed with meal, an improved deck, said deck comprising a plurality of spaced bar members, each of said bar members comprising
   a top side and a bottom side, said bar members arranged in said apparatus with said top side of each adjacent a top side of another bar member to thereby form said deck surface area and provide deck surface spaces between adjacent bar members, said deck surface spaces in fluid communication with said chamber for supplying steam to said meal, said deck surface spaces together, defining an open area comprising more than about 5% of said deck surface area.

3. Improved deck as recited in claim 2 wherein said open area comprises from about 5–30% of said deck surface area.

4. Improved deck as recited in claim 3 wherein said open area comprises from about 20–30% of said deck surface area.

5. Improved deck as recited in claim 2 wherein a widthwise dimension of said top side is greater than a widthwise dimension of said bottom side.

6. Improved deck as recited in claim 5 wherein said deck surface area is generally circular and wherein said bar members are disposed in a plurality of generally pie-shaped arcuate sections, said sections arranged in side by side arrangement to form said generally circular deck surface area, said bar members in each said generally pie-shaped arcuate section being disposed in parallel relation to adjacent said bar members.

7. Improved deck as recited in claim 2 wherein said bar members are parallel to each other and spaced apart from each other.

8. An improved desolventizer comprising:
   a deck;
   a chamber below said deck into which steam is introduced;
   said deck including a plurality of spaced bars for supporting solids and a plurality of openings intermediate said spaced bars providing fluid communication between said chamber and said solids wherein steam passes upwardly through said deck; and
   mounting supports supporting said bars and mounting them to said desolventizer.

9. An improved desolventizer for desolventizing solvent laden solids and having a closed upper chamber, a lower chamber below said upper chamber, and a steam source in fluid communication with said lower chamber, wherein the improvement comprises:
   a deck disposed adjacent the bottom of said upper chamber, said deck including a plurality of bars for supporting said solids thereon and defining a plurality of openings between adjacent ones of said bars wherein steam from said lower chamber passes through said openings into said solids in said upper chamber, supports for supporting said bars, said supports mounted within said upper chamber, and a discharge passage to discharge said solids from said upper chamber.

10. A desolventizer comprising:

a chamber adapted for reception of solvent-laden meal therein;

a shaft extending through said chamber;

a stirrer rotatably mounted on said shaft and adapted to stir said solvent laden meal; and a foraminous deck adapted to support said solvent laden mean thereon and allow passage of steam therethrough for treatment of said meal in said chamber;

wherein said deck includes a plurality of bar members generally parallel to each other and spaced apart from each other.

11. Desolventizer as recited in claim 10 further comprising support means for supporting said bar members in said chamber.

12. Desolventizer as recited in claim 11 further comprising discharge means operatively associated with said chamber adapted for discharging said meal from said chamber.

13. In a desolventizer of the type having a chamber adapted for reception of solvent-laden meal therein, a shaft extending through said chamber, a stirrer rotatably mounted on said shaft and adapted to stir said solvent laden meal thereon and allow passage of steam therethrough for treatment of said meal in said chamber, the improvement wherein said deck comprises a plurality of bar members generally parallel to each other and spaced apart from each other, wherein said spaced bar members are arranged in a plurality of generally arcuate screen sections, said screen sections joined together to form a generally circular deck surface.

14. Desolventizer as recited in claim 13 wherein said bars are substantially radially spaced apart about said shaft.

15. Desolventizer according to claim 13 wherein said bars define openings through said deck, the surface area of said openings covering from about 20% to about 30% of the surface area of said deck.

* * * * *